(12) United States Patent
Chai et al.

(10) Patent No.: US 10,170,967 B2
(45) Date of Patent: Jan. 1, 2019

(54) VIBRATION MOTOR

(71) Applicants: Zhilin Chai, Shenzhen (CN); Jinquan Huang, Shenzhen (CN); Hongfu Xu, Shenzhen (CN); Fanghua Ling, Shenzhen (CN)

(72) Inventors: Zhilin Chai, Shenzhen (CN); Jinquan Huang, Shenzhen (CN); Hongfu Xu, Shenzhen (CN); Fanghua Ling, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 186 days.

(21) Appl. No.: 15/358,689

(22) Filed: Nov. 22, 2016

(65) Prior Publication Data

US 2017/0373574 A1 Dec. 28, 2017

(30) Foreign Application Priority Data

Jun. 23, 2016 (CN) .................... 2016 2 0631985 U

(51) Int. Cl.
*H02K 33/00* (2006.01)
*H02K 33/16* (2006.01)

(52) U.S. Cl.
CPC ............ *H02K 33/00* (2013.01); *H02K 33/16* (2013.01); *H02K 2211/00* (2013.01)

(58) Field of Classification Search
CPC .............................. H02K 33/02; H02K 33/16
USPC ........................................ 310/15, 25, 32, 36
See application file for complete search history.

(56) References Cited

U.S. PATENT DOCUMENTS

2009/0267423 A1* 10/2009 Kajiwara ............... H02K 33/02
310/36
2012/0169148 A1* 7/2012 Kim ....................... H02K 33/16
310/25

* cited by examiner

*Primary Examiner* — Nguyen Tran
(74) *Attorney, Agent, or Firm* — Na Xu; IPro, PLLC

(57) ABSTRACT

A vibration motor is disclosed. The vibration motor includes a housing; an elastic connecting piece accommodated in the housing; a fixed component; and a vibrating component suspended in the housing by the elastic connecting piece. One of the fixed component and the vibrating component includes a coil, and the other including a magnet. The vibration motor further includes a damping piece integrated with the elastic connecting piece.

9 Claims, 4 Drawing Sheets

VIBRATION MOTOR

FIELD OF THE INVENTION

The invention is related to the technology of vibrators, and especially relates to a vibration motor for providing tactile feedbacks.

DESCRIPTION OF RELATED ART

The portable consumer electronic products are favored by more and more people along with development of the electronic technologies, such as mobile phone, handheld game player, navigation unit or handheld multimedia entertainment equipment, etc. The vibration feedback, which is taken as one feedback form of the portable consumer electronic product, has been extended to provide the tactile feedback related to application program and scene, etc. gradually from the initial and most fundamental coming call prompt, etc. While the motor is the primary element offering vibration feedback in the mobile equipment and usually comprises a rotary motor, a piezoelectric motor, a linear motor, etc., wherein the linear motor has the absolute advantage on the aspect of offering the tactile feedback related to the application program and the scene due to its small volume, long service life, low power dissipation, rapid response, etc.

When a related vibration motor runs, a sufficient driving force should be guaranteed, otherwise the return time of vibration of the vibrating component is too long and the vibrating component does not realize the rapid back-and-forth movement due to the big driving force; and in addition, due to the big driving force, the amplitude of a vibrating component is too big, and the vibrating component impacts a housing of the vibration motor to cause the failure of impact of the vibration motor and produce the impact noise.

A method of arranging magnetic liquid between the vibrating component and the housing is adopted by the vibration motor of a relevant technology. However, when arranging the magnetic liquid, an accommodating space for accommodating the magnetic liquid should be arranged on the vibrating component, therefore, the vibrating component should be additionally processed, thereby, increasing the processing process, reducing the production efficiency, and increasing the production cost.

A method of arranging foam between an elastic connecting piece and the vibrating component is also adopted by the vibration motor of a relevant technology, and a complementary and matched structure should be arranged between the vibrating component and the foam, so that the foam can be clamped on the vibrating component. In addition, in order to guarantee that the foam is stably clamped on the vibrating component, a dispensing slot should be arranged usually, and the additional dispensing operation is carried out. Therefore, the production process is relatively complicated, and the processing process involved is relatively many, thus, causing that the production efficiency is low, and the cost is high.

Therefore, it is necessary to provide an improved linear motor to overcome above disadvantage.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby are only to explain this disclosure, not intended to limit this disclosure.

Figure 1:
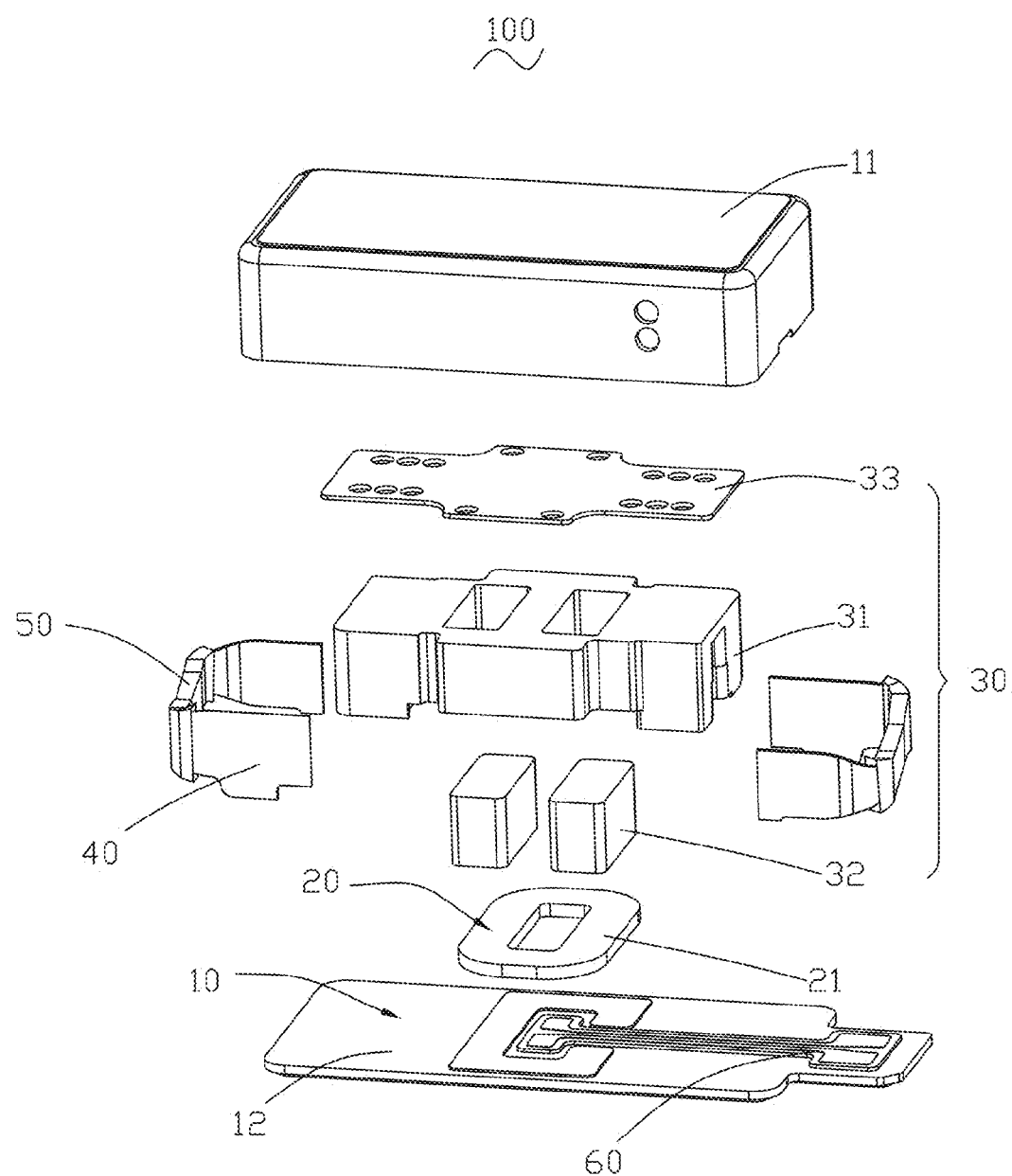
FIG. 1 is an exploded view of a vibration motor in accordance with a first embodiment of the present disclosure.
Figure 2:
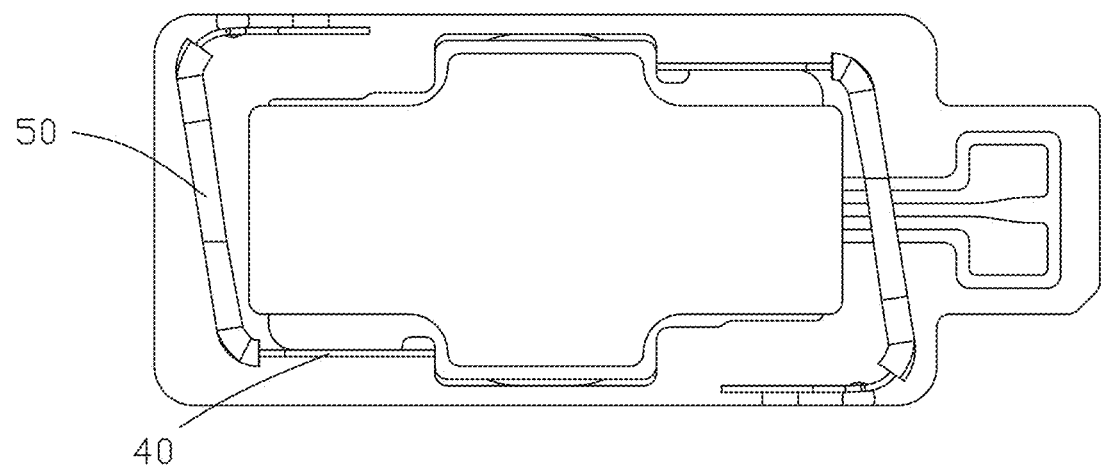
FIG. 2 is an isometric view of the vibration motor in FIG. 1, wherein a shell thereof has been removed.

As shown in FIGS. 1-2, a vibration motor 100 in accordance with a first exemplary embodiment comprises a housing 10 having an accommodating space, and a fixed component 20, a vibrating component 30 and an elastic connecting piece 40 which are accommodated in the housing 10. The housing 10 comprises a housing body 11 and a cover plate 12 covering the housing body 11 for forming the accommodating space. The fixed component 20 is fixed on the cover plate 12

The vibrating component 30 is suspended in the accommodating space through the elastic connecting piece 40, and vibrates along a length direction parallel to the cover plate 12.

Specifically, as shown in FIGS. 1-2, in the embodiment, the fixed component 20 comprises a coil 21 fixed on the cover plate 12, and the coil 21 is connected with an external circuit (not showed in Fig.) through a circuit board 60 arranged on the cover plate 12 as well to realize electrical signal input. The vibrating component 30 comprises a counterweight 31, a magnet 32 accommodated in the counterweight 31 and a pole plate 33 arranged on the counterweight 31 and far away from an end surface of the cover plate 12 at least. Of course, the fixed component 20 and the vibrating component 30 are not limited to the above-mentioned structural configuration. In fact, the components with locations which would not be changed with respect to the housing 10 can be taken as one part of the fixed component 20 in the vibration motor 100; while the components reciprocating in the accommodating space in presence of the electromagnetic induction force between the coils and the magnet can be taken as one part of the vibrating component 30. For example, the roles of the coils 21 and the magnet 32 can be exchanged in other embodiments. For example, the fixed component 20 can comprises the magnet which is fixed on the cover plate 12; while the vibrating component 30 shall include the coils correspondingly, and the coils can be suspended in the accommodating space.

Further, the vibration motor 100 further comprises a damping piece 50 arranged on the elastic connecting piece 40, wherein the damping piece 50 is preferably integrated with the elastic connecting piece 40 in the embodiment, and particularly and preferably, the damping piece 50 is integrated with the elastic connecting piece 40 by injection molding or extrusion molding. Therefore, when producing and processing, the prepared elastic connecting piece 40 can be placed in an injection mold, so that it can be formed into the damping piece 50 at an appropriate position thereof by injecting a damping material, and then, the formed elastic connecting piece 40 having the damping piece 50 is connected with the counterweight 31, thus, the vibrating component 30 realizes a damping buffer effect through the integrated damping piece 50 in a vibration process, wherein the damping material that the damping piece 50 is made of includes but not limited to rubber, and particularly and preferably, silica gel.

Therefore, the damping piece 50 is formed on the elastic connecting piece 40 by the vibration motor 100 by virtue of an integral forming way, without the need of arranging a specific slot or a dispensing slot on the vibrating component 30 (especially the counterweight), or arranging a specific magnetic liquid accommodating space; and moreover, the processing process is relatively few, the production efficiency is relatively high, and the production cost is relatively low.

Figure 3:
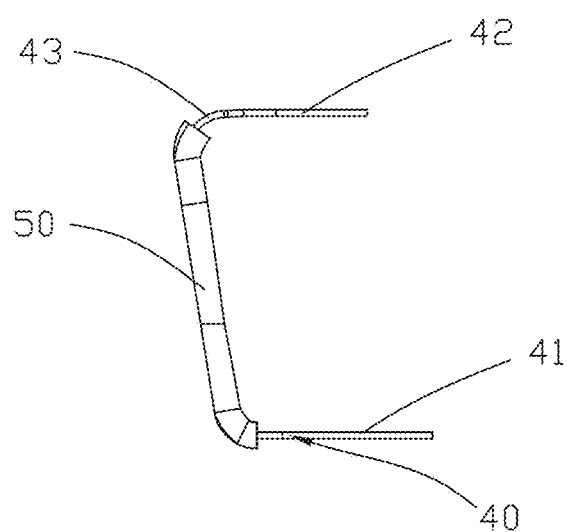
FIG. 3 is an illustration of an assembly of an elastic connecting piece and a damping piece in FIG. 1.

FIG. 3 shows an assembly structure of the elastic connecting piece 40 and the damping piece 50 in the first embodiment of the present disclosure. As show in FIG. 3, the elastic connecting piece 40 is generally U-shaped, and generally comprises a first connecting part 41 connected with the vibrating component 30, a second connecting part 42 connected with the housing 11, and a middle connecting part 43 connecting the first connecting part 41 and the second connecting part 42. Wherein the damping piece 50 is coated in a periphery of the middle connecting part 43 by the integral forming way, thus, the connection strength and firmness of the damping piece 50 on the middle connecting part 43 can be increased. Therefore, when forming, the elastic connecting piece 40 can be directly plated in a forming mold, and the damping piece 50 is directly coated on the middle connecting part 43 through injection molding or extrusion and other integral forming ways.

Figure 4:
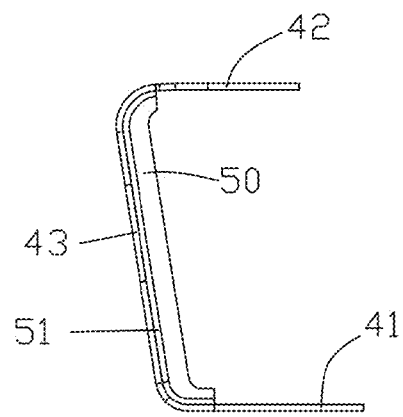
FIG. 4 is an illustration of an assembly of an elastic connecting piece and a damping piece, in accordance with a second exemplary embodiment.

FIG. 4 shows an assembly structure of an elastic connecting piece 40 and a damping piece 50 in accordance with a second exemplary embodiment of the present disclosure. As shown in FIG. 4, the structure of the elastic connecting piece 40 is the same as that of the elastic connecting piece in FIG. 3, both of which comprise a first connecting part 41, a second connecting part 42 and a middle connecting part 43.

Different from the first embodiment, in this embodiment, the damping piece 50 is not coated in the periphery of the whole middle connecting part 43, but only formed on a surface that the middle connecting part 43 is faced towards the vibrating component 30 (especially the counterweight). At this time, in order to reinforce the connection strength between the middle connecting part 43 and the damping piece 50, an adhesive layer 51 is also arranged between the damping piece 50 and the middle connecting part 43. When forming, the adhesive layer 51 is coated on a surface that the middle connecting part 43 is faced towards the counterweight 31, and then, the damping piece 50 is formed on the middle connecting part 43 through injection molding or extrusion molding, wherein the adhesive layer 51 can be a two-sided adhesive layer, a resin adhesive layer, a back adhesive layer, etc.

Figure 5:
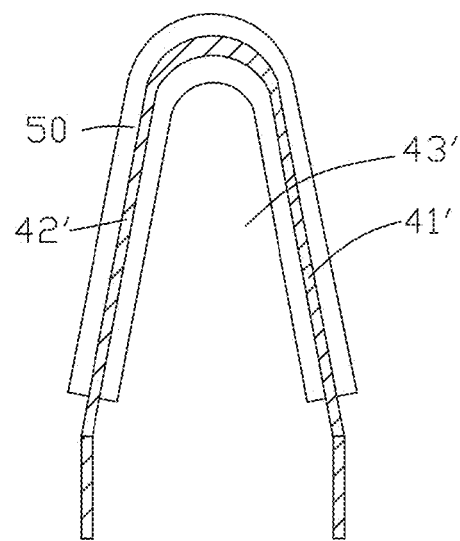
FIG. 5 is an illustration of an assembly of an elastic connecting piece and a damping piece, in accordance with a third exemplary embodiment.

FIG. 5 shows an assembly structure of an elastic connecting piece 40 and a damping piece 50 in accordance with a third embodiment of the present disclosure. As shown in FIG. 5, the elastic connecting piece 40 generally comprises a first connecting arm 41' and a second connecting arm 42', wherein the first connecting arm 41' is interconnected with one side of the second connecting arm 42', and an elastic deformation gap 43' is formed to each other at the other side. In embodiment, the first connecting arm 41' is connected with the housing 11, and the second connecting arm 42' is connected with the counterweight 31.

The damping piece 50 is coated in a periphery of the elastic connecting piece 40 by an integral forming way, thus, the connection strength and firmness of the damping piece 50 on the middle connecting part 43 can be increased.

In this embodiment, the damping piece 50 is not full of the elastic deformation gap 43' completely. However, according to other embodiments of the present disclosure, the damping piece 50 can also be full of the whole elastic deformation gap 43'.

Certainly, according to other embodiments of the present disclosure, the damping piece 50 can also be only coated in the periphery of the connecting arm 41' or a second connecting arm 42', and can also be formed at a position that the elastic connecting piece 40 has maximum elastic deformation.

Figure 6:
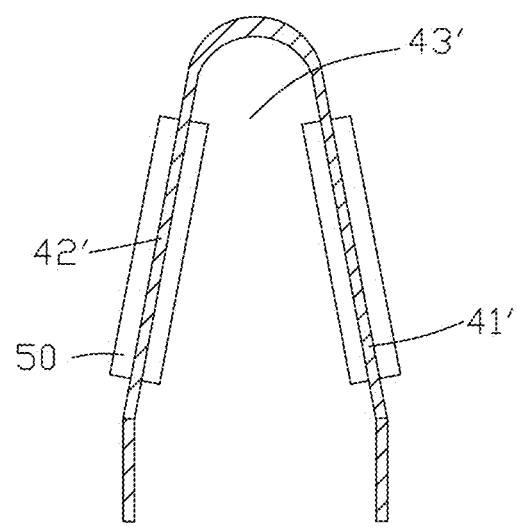
FIG. 6 is an illustration of an assembly of an elastic connecting piece and a damping piece, in accordance with a fourth exemplary embodiment.

FIG. 6 shows an assembly structure of an elastic connecting piece 40 and a damping piece 50 in accordance with a fourth embodiment of the present disclosure. As shown in FIG. 6, the structure of the elastic connecting piece 40 is the same as that of the elastic connecting piece 40 in FIG. 5, both of which comprise a connecting arm 41' and a second connecting arm 42'. At this time, the damping piece 50 is two, and the two damping pieces 50 are coated at the part of the first connecting arm 41' and the connecting arm 42' by an integral forming way respectively, and separated to each other and not contacted.

In the following, the working principle of the vibration motor is briefly introduced in combination with FIGS. 1-6.

When the vibration motor runs, a periodic electrical signal is transmitted to the coil 21 through the circuit board 60, thus, the magnet 32 is stressed due to a periodic magnetic field; and a current direction is changed with time, which causes that a stress direction of the magnet 32 is also changed, thereby, driving the vibrating component 30 is do a reciprocating motion along a length direction parallel to the cover plate 12 under the support of the elastic connecting piece 40.

According to the present disclosure, the damping piece 50 is formed on the elastic connecting piece 40 by an integral forming way, on one hand, too big amplitude of the vibrating component can be effectively inhibited, so that the vibrating component 30 and/or the elastic connecting piece 40 do/does not impact the housing 11; and on the other hand, the production and processing process can be reduced, the production efficiency can be improved, and the production cost can be reduced.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor comprising:
   a housing;
   an elastic connecting piece accommodated in the housing;
   a fixed component;
   a vibrating component suspended in the housing by the elastic connecting piece;
   one of the fixed component and the vibrating component including a coil, and the other one of the fixed component and the vibrating component including a magnet; and
   a damping piece integrated with the elastic connecting piece, wherein the elastic connecting piece comprises a first connecting part connecting with the vibrating component, a second connecting part connecting with the housing, and a middle connecting part connecting the first connecting part with the second connecting part, the damping piece is coated in a periphery of the middle connecting part.

2. The vibration motor as described in claim 1, wherein the damping piece is made of silica gel.

3. The vibration motor as described in claim 1, wherein the damping piece is formed on the elastic connecting piece by injection or extrusion.

4. The vibration motor as described in claim 1, wherein the damping piece is integrated on a surface of the middle connecting facing the vibrating component, and an adhesive layer is arranged between the damping piece and the middle connecting part.

5. The vibration motor as described in claim 4, wherein the adhesive layer is a two-sided adhesive layer, a resin adhesive layer or a back adhesive layer.

6. The vibration motor as described in claim 1, wherein the elastic connecting piece comprises a first connecting arm and a second connecting arm, wherein the first connecting arm is interconnected with one side of the second connecting arm, and an elastic deformation gap is formed to each other at the other side.

7. The vibration motor as described in claim 6, wherein the damping piece is coated in a periphery of the elastic connecting piece, and full of the elastic deformation gap.

8. The vibration motor as described in claim 6, wherein the damping piece is coated in a periphery of the first connecting arm or the second connecting arm.

9. The vibration motor as described in claim 6, wherein an amount of the damping piece is two, and the two damping pieces coat parts of the first connecting arm and the connecting arm respectively, further the two damping pieces are separated from each other.

* * * * *